(12) United States Patent
Battiti et al.

(10) Patent No.: US 6,341,013 B1
(45) Date of Patent: Jan. 22, 2002

(54) METHOD AND DEVICE FOR REGULATING THE ATTITUDE OF A MOTOR VEHICLE

(75) Inventors: Roberto Battiti, Trento; Remo Corghi, Correggio, both of (IT)

(73) Assignee: Corghi S.p.A., Reggio Emilia (IT)

( * ) Notice: Subject to any disclaimer, the term of this patent is extended or adjusted under 35 U.S.C. 154(b) by 0 days.

(21) Appl. No.: 09/126,744

(22) Filed: Jul. 31, 1998

(30) Foreign Application Priority Data

Aug. 1, 1997 (IT) ......................................... RE97A0055

(51) Int. Cl.⁷ ............................................. G01B 11/26
(52) U.S. Cl. ................. 356/139.09; 356/55; 33/203.18; 382/104; 382/203; 701/82; 702/95; 702/150; 702/151
(58) Field of Search ................................ 382/104, 291, 382/203, 286; 340/933; 701/82; 180/271; 173/178 R; 702/113, 150, 151, 152, 153

(56) References Cited

U.S. PATENT DOCUMENTS

| 4,097,157 A | * | 6/1978 | Lill | 356/152 |
| 4,159,574 A | * | 7/1979 | Samuelsson et al. | 33/228 |
| 4,498,744 A | * | 2/1985 | Ealovega et al. | 352/89 |
| 4,823,470 A | * | 4/1989 | Horvallius | 33/288 |
| 5,054,918 A |   | 10/1991 | Downing et al. |  |
| 5,489,979 A | * | 2/1996 | Corghi | 356/139.09 |
| 5,943,783 A | * | 8/1999 | Jackson | 33/288 |
| 5,969,246 A | * | 10/1999 | Jackson et al. | 73/459 |

FOREIGN PATENT DOCUMENTS

| DE | 29 48 573 | * | 4/1981 |
| DE | 2948573 |   | 4/1981 |
| DE | 4217702 |   | 11/1993 |
| EP | 0803703 |   | 10/1997 |

* cited by examiner

Primary Examiner—Thomas Black
Assistant Examiner—Jacques Veillard
(74) Attorney, Agent, or Firm—Birch, Stewart, Kolasch & Birch, LLP (57) ABSTRACT

A method for regulating the attitude of a motor vehicle by measuring the characteristic angles of the wheels, includes the following operations: obtaining at least one pair of images of each moving wheel while the vehicle is being positioned on the measuring site; calculating for each image the ellipse resulting from the interpolation of a discrete number of points lying on the image; establishing a correspondence between the points identified in each pair of images, to uniquely determine the edge of the wheel rim and its spatial position; calculating the value of the characteristic attitude angles relative to the spatial position of the wheel rim.

10 Claims, 5 Drawing Sheets

METHOD AND DEVICE FOR REGULATING THE ATTITUDE OF A MOTOR VEHICLE

BACKGROUND OF THE INVENTION

1. Field of the Invention

This patent relates to a method for measuring the characteristic angles of the attitude of a vehicle for the purpose of its regulation, and the device for implementing the method.

2. Description of Background Art

Periodically checking the attitude setting of a vehicle is important in ensuring the best road holding and best driving comfort.

Road holding is directly proportional to the vehicle road adherence, which is itself a function mainly of two factors, namely the area of contact of the tires with the ground, and the wheel drift, these both depending on the geometry of the vehicle frame and of the suspensions.

The geometry of a vehicle frame provided with wheels and suspensions defines the characteristic wheel angles, ie the angles between each wheel and the others, between each wheel and the longitudinal and transverse frame axes, between each wheel and the vehicle running axis and between each wheel and the vertical to the ground, and the steering angles. The correct values of these angles are dictated by the vehicle manufacturer.

These angles must therefore be able to be measured in order to set them to the appropriate values.

The characteristic angles are:

left, right and total front convergence left, right and total rear convergence right and left front camber right and left rear camber right and left incidence right and left kingpin front and rear set-back thrust angle track difference The text will be better understood from the following definitions of the characteristic angles:

the convergence is the angle formed between the plane perpendicular to the axis oil each wheel and the longitudinal axis of symmetry of the vehicle;

the total convergence is the sum of the angles of convergence of the wheels pertaining to one and the same axle;

the track angle is the angle formed between the plane perpendicular to the axis of each wheel and the vertical plane;

the angle of incidence is the angle between the projection of the steering axis onto the vehicle longitudinal plane and the vertical;

the kingpin angle is the angle formed between the projection of the steering axis onto the vehicle transverse plane and the vertical;

the set-back is the misalignment of the wheels of one and the same axle to the vehicle axis of symmetry;

the thrust axis is the axis defined by the bisector of the total rear convergence angle;

the track difference is the angle between the line joining the wheels positioned on one and the same side, but pertaining to two different axles, and the vehicle axis of symmetry.

The most recent known devices used for regulating the attitude of vehicle wheels are based on opto-electronic measuring and sensing instruments.

These devices comprise angle measuring instruments which are generally applied to the vehicle wheels and mutually interact mechanically or optically, or are fixed to the ground to obtain the image of reference markers positioned on the wheels. These reference markers can be either solid locators fixed to the wheels, or images projected onto the wheels.

The data obtained by said devices are fed to a processor which processes them using known geometrical formulas which give as their result the values of the characteristic angles of the frame attitude.

Known devices however suffer from a series of problems which substantially limit both their use and their accuracy.

A first important drawback is the time required for taking the measurements and making the relative adjustment. In this respect, in known devices, more than twenty operations are required for preparing the vehicle and taking a measurement, and it has been found that the preliminary operations involve on an average more than 70% of the time required for carrying out a normal measurement cycle.

A further drawback is determined by the systematic errors introduced by the compensation operation.

The compensation operation reduces the measurement errors deriving from the geometrical deformation of the wheel rim and from the sensor-wheel coupling.

This is achieved by introducing into the measurement a correction factor calculated using data obtained during one turn of the vehicle wheel.

However to achieve a wheel turn without involving considerable space the wheel has to be raised from the ground, so releasing the vehicle weight from the suspension-shock absorber unit.

However this introduces errors due to the fact that during their working stroke the suspensions induce variations in the characteristic angles of the vehicle, hence raising the wheel from the ground leads to the drawback of finding the wheels positioned in a different manner from that when in the running state, which is achieved only after the suspensions have settled.

A further limit of current aligners is the maximum range of angular measurement of the transducers. In particular, this limit is apparent in measurements on the steering geometry.

Motor vehicle manufacturers have generally used a linkage scheme for the steering members known as a "Jeantaud triangle". This configuration ensures concentricity of the circumferences travelled by the wheel through large-radius bends, however for steering through a smaller radius of curvature the Jeantaud triangle creates a condition which progressively deviates from the ideal.

It is therefore apparent how important it is to make accurate measurements on the steering geometry in order to guarantee the safety and road holding of the vehicle.

For effecting these measurements, currently available opto-electronic aligners use rotating plates positioned below the steered wheels and provided with electronic devices. The steering angle is measured by graduated pointers or by electronic transducers which measure the plate rotation.

These systems partly overcome the limited measurement range of transducers, but make indirect measurements which are subject to errors due to the roto-translational movement of the plate. In this respect, during steering, the wheel movement can be resolved into a translation component and a rotation component, this phenomenon being due to the steering axis not passing through the wheel center.

It is apparent that an indirect measurement, such as that made by known devices, is subject to errors due to the double nature of the phenomenon to be measured.

The attitude can be measured and then regulated either by apparatus which take the measurements using devices connected to the wheel rim or by apparatus which do not use any device fixed to the wheel rim.

Apparatus are known for measuring the characteristic attitude angles by mounting measuring devices on all the vehicle wheel rims.

These devices are in the form of goniometers or angle transducers interacting with identical instruments fixed to the wheel rims of two adjacent wheels, in the transverse and longitudinal directions.

This interaction between said instruments can be achieved either mechanically by means of wires or springs, or by electrical and/or optical devices.

When the measurements have been taken, a processor processes the measured data by mathematical algorithms of known type.

Devices are also known which use measuring systems in which no reference material is positioned on the wheel rim.

U.S. Pat. No. 4,899,218 in the name of WALDECKER illustrates a measurement process based on projecting an oscillating structured light beam onto the wheel in such a manner as to produce at least two reference images on it.

Said images are read by video cameras positioned at a certain angle to the optical plane defined by the plane of oscillation of said beam.

The spatial position of the outlines and hence of the wheel is calculated by a computer using a known triangulation system.

Having defined the spatial wheel position in this manner, a processor calculates the characteristic attitude angles relative to a suitable reference system.

The devices utilized in the stated patent are very complicated to use, especially with regard to the procedure for calibrating the apparatus.

Published patent application DE 2948573 in the name of SIEMENS describes an apparatus in which the measurement process is based on pairs of images of the wheel rim edge or of a circumference thereof, taken from different angles.

From these images, ellipses are obtained, from the parameters of which the spatial position of the wheel can be determined knowing the exact position and orientation of the video cameras.

The publication gives no indication of how the system is able to distinguish the edge of the wheel rim, or a concentric circumference positioned thereon, from the tire which surrounds it, and also does not teach how to take account of the inevitable distortions of the ellipse image representing the wheel rim edge, which obviously negatively influence the accuracy of the measurement.

In this respect, the image seen by the video camera is presented as a distorted ellipse in that the side closer to the video camera appears wider than the more distant side and consequently, in order not to commit measurement errors, account should also be taken of the distortions.

In conclusion, all the known devices are affected by systematic measurement errors due to the inevitable inaccuracies caused by the operator in positioning the measuring devices on the wheel rims, or during the compensation operations which require the vehicle wheels to be raised and each wheel turned, or by errors from the said optical distortions, or by irregularities in the shape of the type on which the images are produced, or of the wheel rim itself.

SUMMARY OF THE INVENTION

The object of this patent is to eliminate the aforesaid drawbacks by providing a method and measuring device able to operate without the need to apply specific reference markers or sensors to the wheel, not even in the form of a projected image, and which enables the compensation operation to be carried out without raising the vehicle wheels from the ground, while substantially reducing the time involved in the preparation for and in the execution of the measurement of the characteristic attitude angles.

The method by which the apparatus executes the measurement comprises obtaining and processing a certain number of pairs of images of each wheel while the still moving vehicle is being positioned on the measurement site, for the purpose of identifying the spatial position of the wheel rim. This is achieved by seeking within the images of the circular structures, and identifying, those regions in which the transition between the image grey levels is a maximum, as will be clarified hereinafter.

In this manner, points are determined pertaining to segments of the wheel rim edge, which are processed and associated with a Cartesian reference system, to accurately determine its spatial position by mathematical processes of known type to which reference will be made hereinafter.

Having determined a certain number of points pertaining to the wheel rim edge, the invention calculates for each image the ellipse passing through these points.

Alternatively, the ellipse is calculated as the interpolation of a discrete but large number of points lying on the image of the wheel.

Having determined two ellipses for each wheel from images taken from two positions at different angles, the invention establishes a correspondence between the edge elements of the two ellipses.

In this manner, the edge of the wheel rim and the plane containing it, and hence the wheel track and convergence of each individual wheel are unequivocally determined.

It should be noted that the determination of the ellipses is not essential for the purpose of identifying the edge of the wheel rim and the plane containing it, but is done in that it enables the data to be more rapidly processed as it concentrates the search for the points representing the edge of the wheel rim into limited zones.

The invention achieves this result by a method for measuring the vehicle attitude comprising two video cameras for each wheel having their lens facing the measurement site and connected stably thereto. The video cameras are connected by known means to a processor arranged to process the images of each wheel as seen by them, in order to determine the wobble of the wheel rim, ie the nonperpendicularity of the plane of the wheel rim to the axis of rotation thereof, and to calculate the characteristic attitude angles.

For each wheel the two video cameras obtain several pairs of images with the wheel in movement, the invention being able to determine the wobble of the wheel rim about the axis of rotation by known algorithms.

By comparing data relating to the angular variation in the horizontal, vertical and rotational planes measured in at least two different steered positions, the invention also calculates the spatial position of the steering axis and is hence able to calculate all the characteristic angles of the vehicle attitude and to display them on the processor monitor to enable the operator to make the necessary adjustments.

It is apparent that the invention can achieve the same result using only one video camera per wheel or only one video camera in total with the consequent use of suitable optical paths, formed with the aid of fixed and/or movable mirrors and possible shutters, which enable all the wheels to be seen in succession from the point of observation.

The particular characteristics of the device and of the method are specified in the claims.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be more apparent in terms both of the method and the device from the description of a preferred embodiment thereof given hereinafter by way of non-limiting example with reference to the accompanying drawings.

DESCRIPTION OF THE PREFERRED EMBODIMENTS

Said figures show a measurement site 1, comprising a usual vehicle lift 2 to which there are securely connected, by known means, four support devices 3, 4, 5, 6, identical in pairs, for the video cameras 7, which are connected to units 12 for processing the data obtained.

The devices 3 and 4 are positioned facing each other on the outsides of the runways of the vehicle lift 2, in proximity to the front end thereof.

The devices 5 and 6 are positioned facing each other on the outsides of the runways of the vehicle lift 2, in proximity to the rear end thereof.

Each of said support devices 3, . . . 6, comprises a movable frame 8 which slides on two guides 9 positioned parallel to the axis of symmetry of the lift, and on which are mounted two identical video cameras 7. The movable frame 8 is moved by a fixed geared motor 10 driving a worm 11, and a bush, not shown, connected to the movable frame 8.

The devices 5 and 6 differ from the devices 3 and 4 only in terms of the length of the guides 9 and of the worm 11.

In addition, the devices 3 and 6 are provided with a linear position transducer, of known type not shown, which enables the vehicle wheelbase to be determined.

Figure 1:
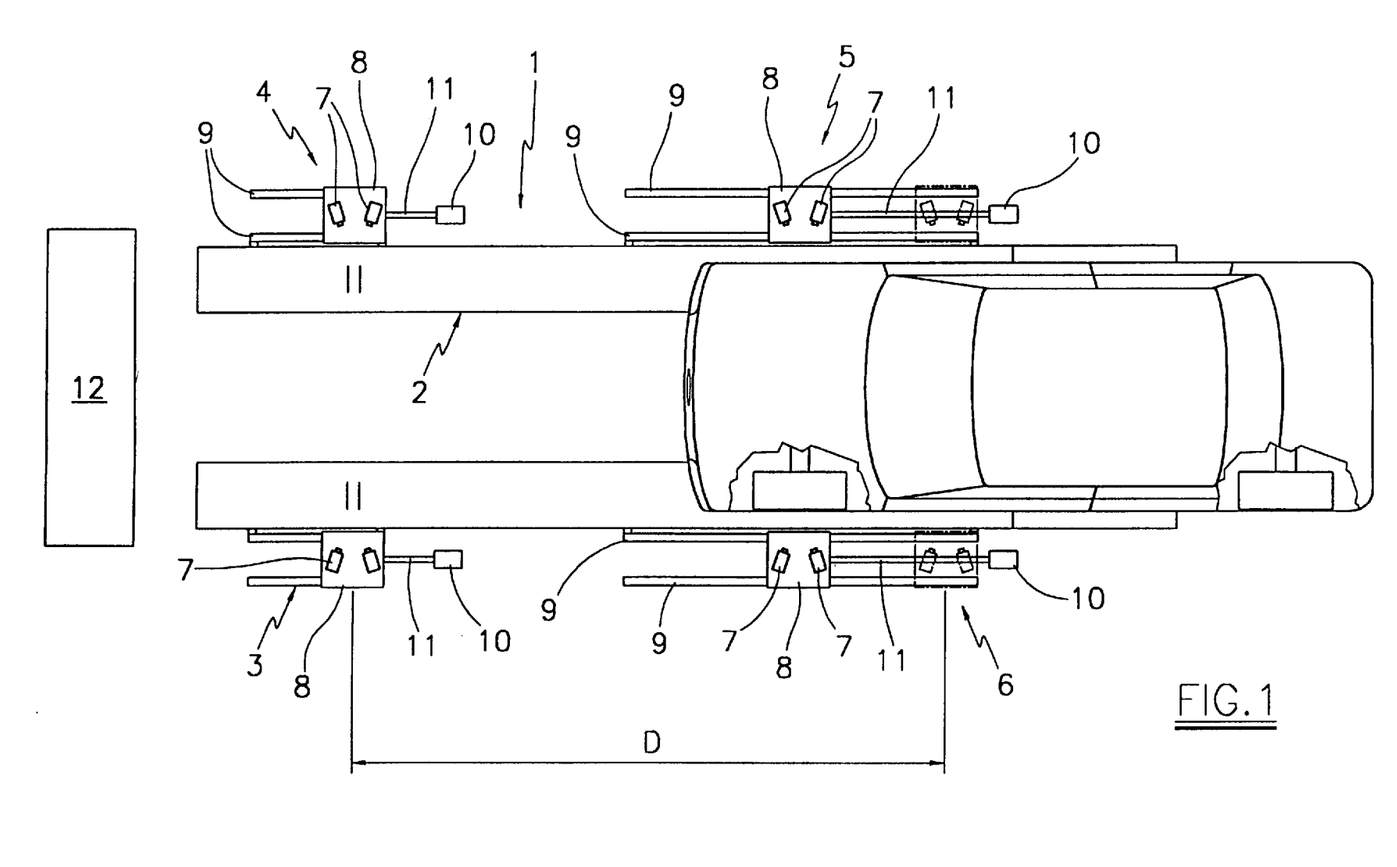
FIG. 1 is a view of the invention from above while a moving vehicle is being positioned on the measurement site.
Figure 2:
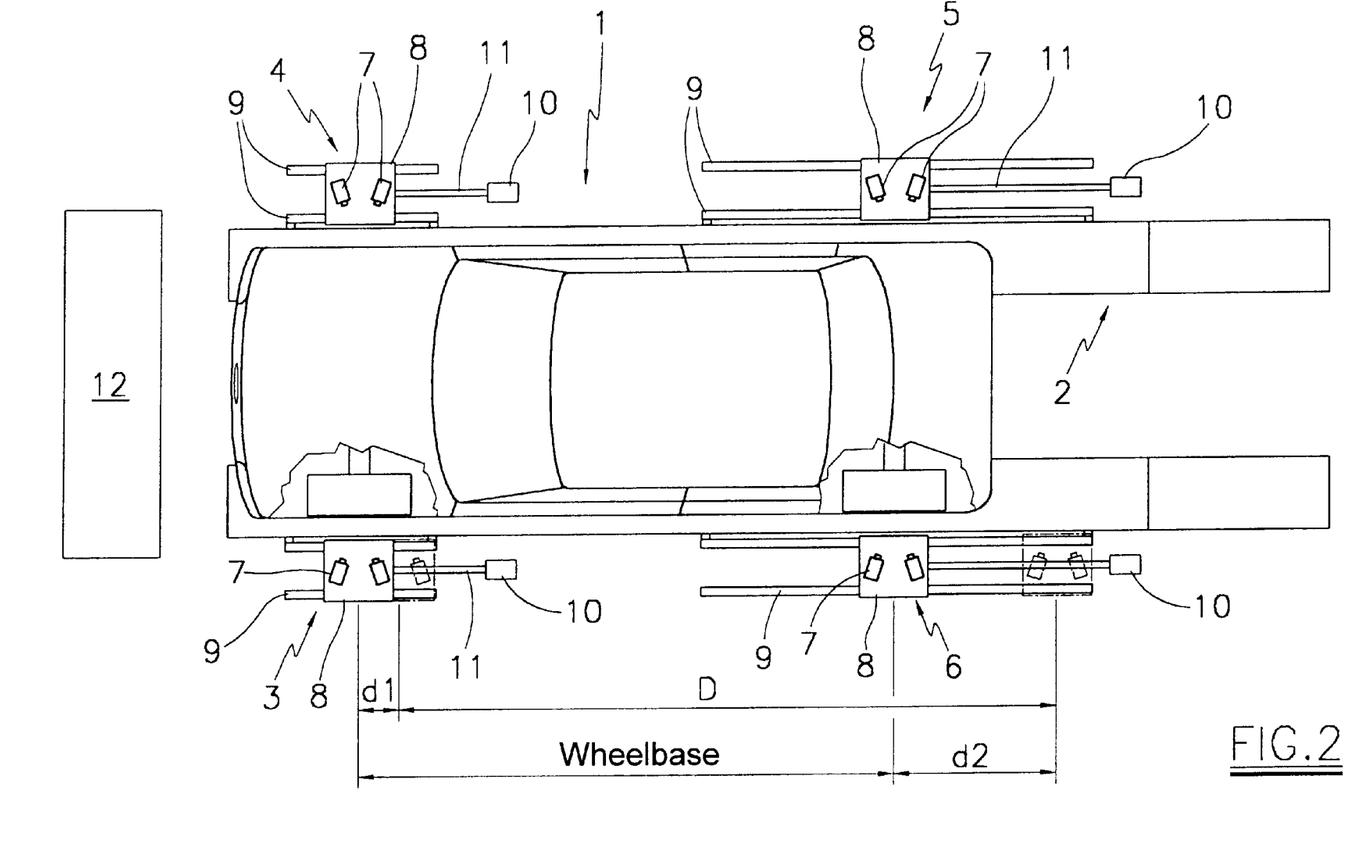
FIG. 2 is a view of the invention from above with the vehicle already positioned.
Figure 3:
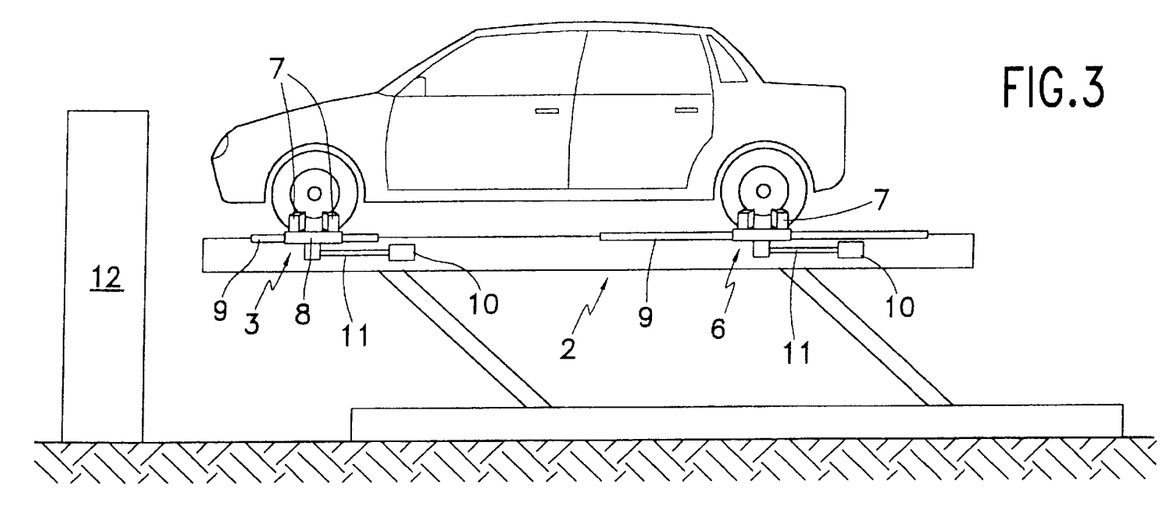
FIG. 3 is a side view of the invention.

This is done according to the invention, as shown in FIG. 2, by using the relationship:

$$\text{Wheelbase} = D + d_1 - d_2$$

where D is the distance between the initial positions of the two transducers, $d_1$ is the distance measured by the position transducer of the support device 3, and $d_2$ is the distance measured by the position transducer of the support device 6 (see FIG. 1 and FIG. 2).

When the system detects that a new vehicle is entering the measurement site, the geared motor drives the movable frame 8 supporting the video camera 7 in such a manner as to maintain the wheel image always in the center of the field of vision of the video cameras. This is achieved by forming a usual closed loop system in which the image obtained by the video camera 7 is fed to the data processing unit 12, which operates the geared motor by means of actuators of known type. The geared motor parameters controlled by the processing unit 12 are its velocity and direction of rotation. In this respect, both these parameters are essential to achieve total control of the relative distance of the position transducers of the support devices 3 and 6.

For a better understanding of the invention, a brief description of the reference system will be given on the basis of the area of measurement of a single wheel, this being equal for all the wheels.

Figure 4:
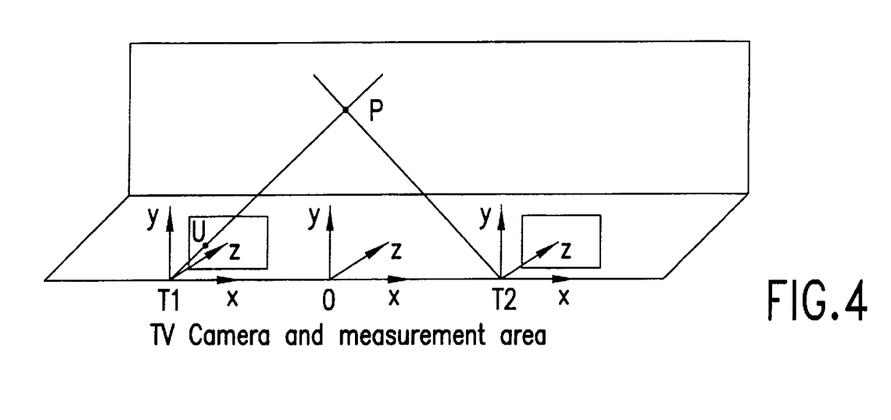
FIG. 4 shows the relationship between the various Cartesian reference systems used.
Figure 5:
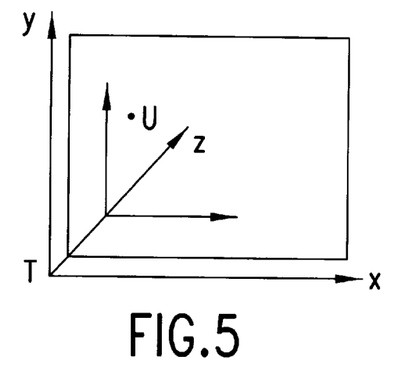
FIG. 5 shows an enlarged part of FIG. 4.

The points T1 and T2 identify the origins of the perpendicular reference systems of each video camera relative to the absolute reference system having its origin at 0, as shown in FIG. 4.

A generic point P in space has coordinates Px, Py, Pz within the absolute reference system having its origin at 0.

In addition, for each video camera there is defined an image plane perpendicular to the z axis of the reference system of origin Ti, i=1,2 and at unit distance from the origin Ti, i=1,2.

The points pertaining to the image planes have coordinates $Ui=(Uxi, Uyi, 1)$; these points are determined by projective transformation, which associates with each point of three-dimensional space a point Ui given by the intersection of the straight line joining T and Ti with the image plane, where i=1,2.

Figure 6:
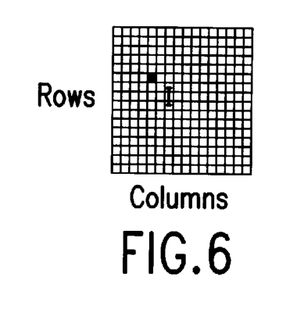
FIG. 6 represents the coordinates in the plane of the image of a determined point on the wheel rim.

The coordinates in pixels of a point on the active surface of the video camera are identified by the bidimensional vector I the components (Ix, Iy) of which are the column and row of the image as is apparent from FIG. 6.

The transformation between the Ui coordinates and the I coordinates in terms of pixels, of a point on the active surface of the video camera is achieved by the calibration operation.

The purpose of the calibration is to obtain a function which enables the pixel coordinates (active surface of the sensor) to be converted into the Ui coordinates of the aforedefined image plane, for each apparatus formed by one video camera of the measuring system.

To pass from a point I of the image to a point U in the image plane, non-parametric modelling techniques also known as neural networks can be used.

These represent a possible solution to the problem of determining an input/output function using a scheme of learning from available examples, by seeking the best function from a suitable class of functions in accordance with a predetermined criterion.

Figure 7:
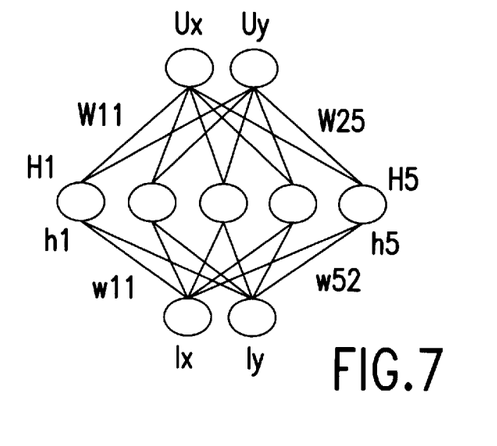
FIG. 7 represents an example of a neural network.

Specifically, the multi-level perceptron is a neural network, shown schematically in FIG. 7, consisting of units known as neurons arranged on different levels. The output reply to an input signal is obtained by forward propagation of the signal from the neurons of the first level to those of the last level. This propagation occurs on the basis of the connections (known as "weights") existing between neurons pertaining to different levels.

The network is trained by determining its weights by an iterative method starting from an arbitrarily chosen point.

An illustration will be given of the working of a multi-level perceptron from a mathematical viewpoint. In this context, referring for simplicity to networks with a single hidden layer, Ii indicates the inputs, hi and Hi indicate the input and output values of the hidden layer respectively, and ui and Ui indicate the input and output of the exit neurons. The network weights are indicated by wij and Wij for the two layers. The function which transforms an input vector I, the components of which are real numbers, into the corresponding output vector U is constructed as follows: firstly the inputs of the hidden neurons are evaluated, given by $$hj = wj0 + \sum_{k} wjk \cdot Ik \qquad (a)$$

where wj0 represents the threshold of the neuron. The output of each hidden neuron is a function only of the respective input; using a sigmoidal function the output becomes $$Hj = \frac{1}{(1 + e^{-hj})} \qquad (b)$$

Likewise for the output state the input values of the neurons are firstly calculated $$ui = Wi0 + \sum_{j} Wij \cdot Hj \qquad (c)$$

and then the output values which, assuming the sigmoidal transfer function is again used, are given by $$Ui = \frac{1}{(1 + e^{-ui})} \qquad (d)$$

The transfer function allowing passage from the input to the output of a neutron can be one of the following:

$$f(x) = \frac{1}{(1 + e^{-x})}$$

$$f(x) = \left| \frac{1}{(1 + e^{-x})} \right|^{-0.5}$$

f(x)=x

The system is trained using an assembly of P known examples and minimizing the objective function relative to the weights.

During each iteration the algorithm executes the forward propagation (from the entry layer to the exit layer) of the input patterns on the basis of equations (a), (b), (c), (d), evaluates the partial derivatives of the function respect to the network weights, and determines the direction of search for each individual unidimensional minimizing step.

The operations carried out by the system during the usual measurement routines will now be described.

When the vehicle enters the measurement site, as shown in FIG. 1, the system sensors automatically recognize the commencement of the measurement cycle and activate the wheel recognition procedures.

While the vehicle is being positioned, each video camera takes a series of photographs necessary for determining the spatial position of the wheel rim.

The photographs are analyzed by the processor to discriminate the wheel rim from the rest of the images.

This is achieved by the invention by seeking, within the images, the circular "structures" by identifying those regions in which the transition between the grey levels of the image is a maximum, and connecting together the edge elements along the wheel rim.

For this purpose the system uses a Gaussian filter to reduce the noise (disturbance) present in the images, followed by a zero-crossing filter which acts by recalculating the original pixels within a region of dimensions n x n centered on the pixel itself.

The new pixel is obtained by weighting the original values with a suitable matrix.

For example, if n=3 the new pixel is obtained by weighting the original values with the following matrix:

$$[K] = \begin{bmatrix} 1 & 2 & 1 \\ 2 & -12 & 2 \\ 1 & 2 & 1 \end{bmatrix}$$

The edges are identified by those zones of the thus obtained image where adjacent pixels change sign. These zones correspond to the point of maximum rapidity of transition in grey tone change, these points pertaining to the wheel rim edge, in addition to spurious elements, as will be seen hereinafter.

Figure 9A:
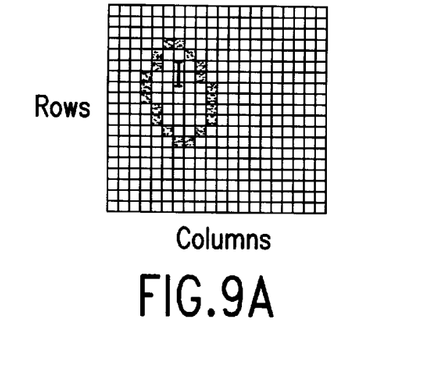
FIG. 9 represents the wheel rim seen by the video camera and, to the side, the same transformed in the plane of projection.
Figure 9B:
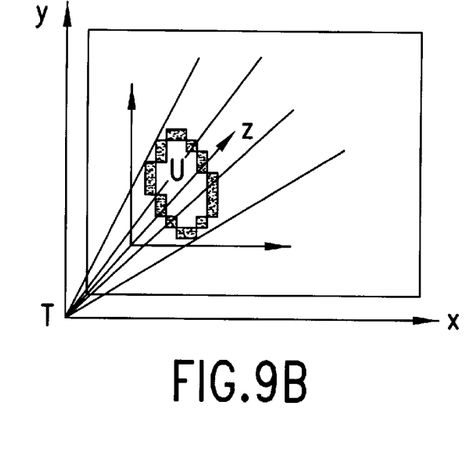

Having identified the transition points within a perpendicular reference system with origin at $T_1$ and $T_2$ (see FIG. 9) and having defined them within the image plane using the said mathematical methods combined with known optical flux techniques, the invention determines their spatial position with greater accuracy using known "spline" interpolation functions.

Figure 8A:
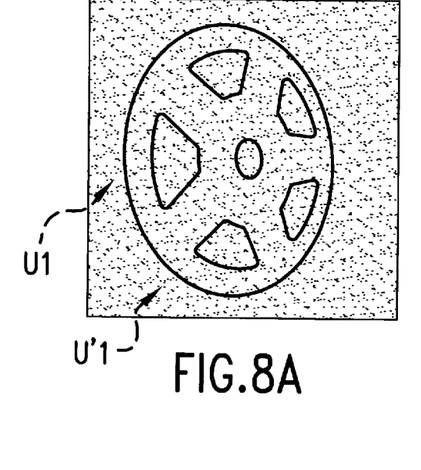
FIG. 8 represents the wheel rim edge calculated relative to the reference scheme positioned in each video camera, with the correspondence between points on the wheel rim edge positioned in the same physical "point".
Figure 8B:
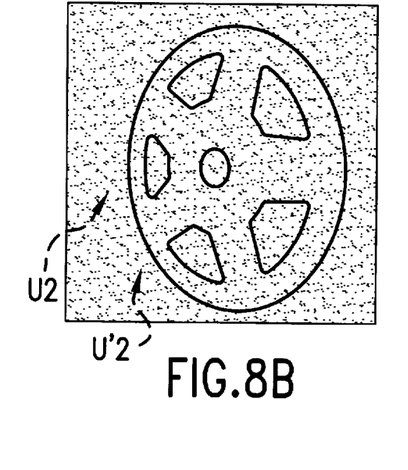

Continuous zones (assemblies of points) are also identified which in addition to the edge of the wheel rim also comprise spurious elements deriving from geometrical structures within it, such as bolts or holes, as shown in FIG. 8.

To simplify and accelerate the calculation procedure, the wheel rim edge is identified by the invention with reference to a conic section module such as an ellipse. In this procedure the search for the points is concentrated within limited regions, hence accelerating the calculations.

To better understand the method by which the invention determines the parameters of the ellipse passing through the identified transition points, the procedure will be described.

The most general form of the Cartesian equation of a conic section is the following:

$$ax^2 + 2bxy + cy^2 + dx + ey + f = 0$$

Given five points lying in a plane along an ellipse, the equation of the ellipse passing through them can be uniquely determined.

Substituting for x and y the coordinates of each of the five points, five equations are obtained involving the six unknowns a, b, c, d, e, f.

This homogeneous system has an infinity of solutions, all proportional to each other.

To uniquely identify one of the possible solutions, the parameters are normalized by putting $a^2+b^2+c^2=1$. The system is solved using standard linear equation solution methods.

To determine the center of the ellipse, the following linear system of two equations in x and y is solved:

$$ax+by+d=0$$

$$bx+cy+e=0$$

The coordinates of the center are hence given by the solution (xo, yo) of this system.

It is apparent that by using this calculation procedure it is not necessary to see the entire wheel to determine the edge of the wheel rim, it being sufficient to see a portion thereof.

Having determined the ellipses for the right and left image of the same wheel (see FIG. 8) and selected the segments of the wheel rim edge, the invention establishes a correspondence between elements of the edge of the images which correspond to the same physical point.

For example, in FIG. 8, the edge element of the left image identified by $U_1$ is made to correspond with the edge element of the right image identified by $U_2$. Likewise the element $U'_1$ is made to correspond with $U'_2$.

These correspondences are used in the intersection procedure between two beams.

Figure 10:
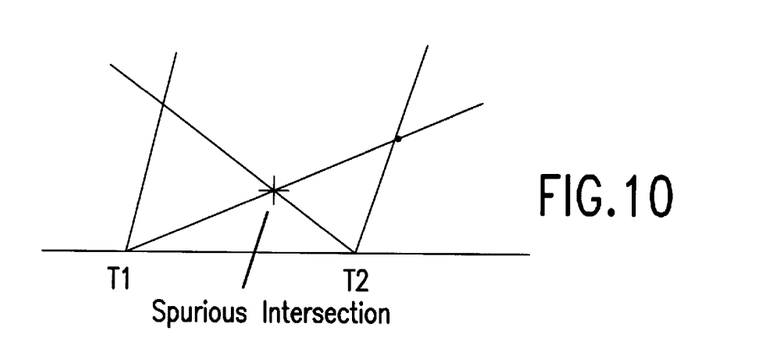
FIG. 10 represents a spurious intersection.

In determining the intersection between two beams, it is possible for a spurious intersection to be obtained (see FIG. 10).

These intersections are discarded using the initially determined association between zones which correspond approximately to the same physical point.

For each pair of beams corresponding to points approximately associated with the same physical point (see also FIG. 10), their "intersection" is determined.

In reality, given the finite accuracy of the sensors and machine arithmetic, an exact intersection is not sought, but instead the points along the two beams at minimum distance apart.

The intersection is then defined as the intermediate position between these points.

The mathematical calculation procedure is as follows.

Let the two points be $T_1=(a_1, a_2, a_3)$, $T_2=(b_1, b_2, b_3)$. Note that $a_3=b_3=0$ and $a_1=-b_1$.

Let $U_1=(p_1, P_2, 1)$ and $U_2=(q_1, q_2, 1)$ be two points pertaining to the image plane which identify the direction of the straight lines joining $T_1$ and $U_1$.

Given the two vectors $x_1(t)=T_1+t_1 U_1$ and $X_2(t)=T_2+t_2 U_2$, where t indicates the modulus of the vectors starting from $T_1$ and $T_2$ with a direction defined by $U_1$ and $U_2$, we wish to calculate the minimum distance between them. The square of the distance is given by:

$$D^2 = \|(T_1 + t_1 \cdot U_1) - (T_2 + t_2 \cdot U_2)\|^2$$

$$D^2 = (T_1^t + t_1 U_1^t - T_2^t - t_2 U_2^t) \cdot (T_1 + t_1 \cdot U_1) - T_2 - t_2 \cdot U_2)$$

Putting $\Delta T^t = (T_1 - T_2)^t$, we have:

$$D^2 = (\Delta T^t + t_1 U_1^t - t_2 U_2^t) \cdot (\Delta T + t_1 \cdot U_1) - t_2 \cdot U_2)$$

$$= (\Delta T^t \Delta T + \Delta T^t t_1 U_1 - \Delta T^t t_2 U_2 + t_1 U_1^t \Delta T + t_1^2 U_1^t U_1 -$$

$$t_1 U_1^t t_2 U_2 - t_2 U_2^t \Delta T - t_2 U_2^t t_1 U_1 + t_2^2 U_2^t U_2)$$

$$= \Delta T^t \Delta T + t_1 (2\Delta T^t U_1) + t_2(-2\Delta T^t U_2) +$$

$$t_1 t_2 (-2 U_1^t U_2 + t_1^2 (U_1^t U_1) + t_2^2 (U_2^t U_2)$$

Differentiating with respect to $t_1$ and $t_2$, we have:

$$\delta D^2 / \delta t_1 = (2\Delta T^t U_1) + t_2(-2U_1^t U_2) + t_1(U_1^t U_1), \text{ and}$$

$$\delta D^2 / \delta t_1 = (-2\Delta T^t U_2) + t_1(-2U_1^t U_2) + t_2(U_2^t U_2)$$

thus putting equal to zero we obtain the following system of two near equations in two unknowns:

$$\Delta T^t U_1 - t_2 U_1^t U_2 + t_1 U_1^t U_1 = 0$$

$$-\Delta T^t U_2 - t_1 U_1^t U_2 + t_2 U_2^t U_2 = 0$$

to hence obtain the matrix system:

$$\begin{vmatrix} U_1^t U_1 & -U_1^t U_2 \\ -U_1^t U_2 & U_2^t U_2 \end{vmatrix} \cdot \begin{vmatrix} t_1 \\ t_1 \end{vmatrix} = \begin{vmatrix} \Delta T^t U_1 \\ \Delta T^t U_2 \end{vmatrix}$$

This system always has a solution provided the two beams are not parallel, seeing that:

$$\begin{vmatrix} U_1^t U_1 & -U_1^t U_2 \\ -U_1^t U_2 & U_2^t U_2 \end{vmatrix} = (\|U_1\|^2 \cdot \|U_2\|^2 - (U_1^t U_2)^2)$$

and the following relationship is valid:

$$\cos(\theta) = \frac{(U_1^t U_2)}{\|U_1\| \cdot \|U_2\|}$$

$\theta$ is the angle between the two vectors $U_1$ and $U_2$.

On termination of this stage, an assembly of points in space is produced, given by the intersection of said beams. These points represent the real position in space of elements of the wheel rim.

Figure 11:
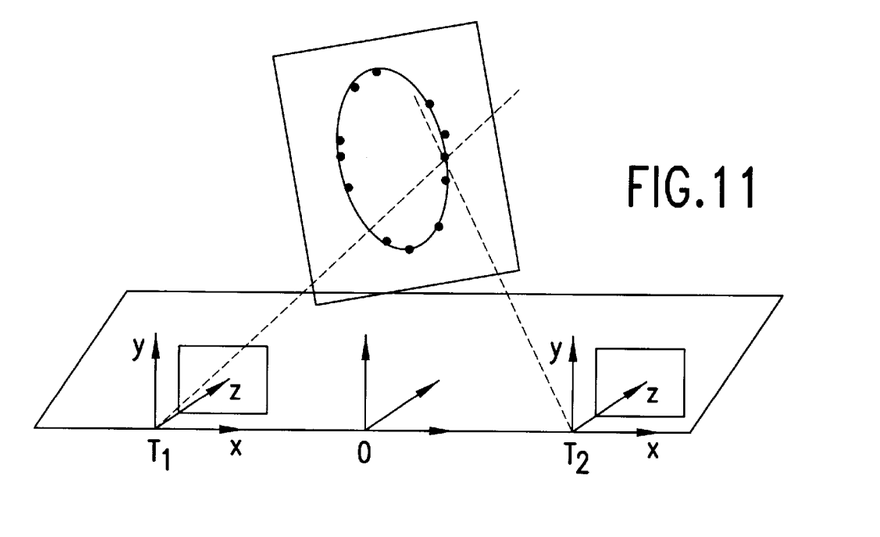
FIG. 11 represents the determination of the plane of the wheel rim.

Having determined at least three points in the described manner, the parameters of the plane passing through these points can be determined (FIG. 11), to unequivocally obtain the spatial information of the wheel plane and hence the corresponding angles. To increase the accuracy, more points can be used, and the wheel plane be determined using known mathematical interpolation procedures.

Having obtained the spatial positions of all the wheel planes, the characteristic angles of the vehicle are calculated using known techniques.

The characteristic vehicle angles are calculated according to the invention by also taking account of possible incorrect positioning of the vehicle within the measurement site. In this respect, it can happen that the longitudinal axis of the vehicle is not parallel to the longitudinal axis of the measurement site, in which case the extent of the positioning error must be calculated together with a parameter for correcting the measurements.

This is achieved by the invention once the spatial position of the wheels has been determined. Knowing this latter it is easy to determine the center of rotation of the wheels and consequently the central point between wheels of the same axle. Having identified this point for both axles, the straight line passing through the two center points, ie the line of symmetry of the vehicle, is uniquely determined, after which using known mathematical relationships the inclination of this line to the axis of symmetry of the measurement site is calculated, and this is taken into account in calculating the characteristic angles of the vehicle.

Wrong positioning of the vehicle within the measurement site can be also determined by using ultrasonic sensors of known type provided for measuring the vehicle body. For this purpose, on each side of the measurement site there are positioned at a known distance apart two ultrasonic sensors, the measurement zone of which faces the join between the vehicle side and the under-body, the distance between the sensor and the vehicle then being measured. By comparing the measurements of the four transducers, the body (frame) position and hence the longitudinal axis of symmetry of the vehicle can be determined.

Knowing the longitudinal axis of symmetry of the vehicle, its displacement from the longitudinal axis of symmetry of the measurement site can be determined, this displacement being taken into account in the calculations used for determining the characteristic attitude angles.

This second solution also has the advantage over the preceding, of aligning the vehicle wheels with the frame position, this not being possible with aligners of known type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for regulating the attitude of a motor vehicle by measuring the characteristic angles of the wheels, comprising the following operations:
   obtaining at least one pair of images of each moving wheel while the vehicle is being positioned on a measuring site;
   calculating for each image the ellipse resulting from an interpolation of a discrete number of points lying on the image;
   establishing a correspondence between the points identified in each pair of images, to uniquely determine an edge of the wheel rim and a spatial position of the wheel rim; and
   calculating the value of the characteristic attitude angles relative to the spatial position of the wheel rim.

2. The method as claimed in claim 1, further comprising the step of identifying the wheel rim edge within the pair of images.

3. The method as claimed in claim 2, further comprising the step of identifying the wheel rim edge by identifying the region in which the transition between the image grey levels is a maximum.

4. The method as claimed in claim 1, further comprising the step of calculating the wheel rim edge from five points lying on the image of the wheel rim edge.

5. The method as claimed in claim 1, further comprising the step of obtaining at least two pairs of images of the moving wheel while the vehicle is being positioned within the measurement site.

6. The method as claimed in claim 5, further comprising the step of calculating any defect in the perpendicularity of the wheel rim axis to its axis of rotation by comparing the two pairs of images of each moving wheel.

7. The method as claimed in claim 1, further comprising the step of obtaining at least two pairs of images of the wheel stationary within the measurement site, said at least two pairs of images corresponding to at least two different steered positions.

8. The method as claimed in claim 7, further comprising the step of comparing the angular variation data obtained in said positions and calculating the spatial position of the steering axis.

9. The method as claimed in claim 1, further comprising the step of determining the center of rotation of the wheels, the axes which join the center of rotation of the front and rear wheels respectively, the straight line which passes through the central points of said axes, and the angular deviations of said straight line from the longitudinal axis of the measurement site, and the correction parameters for the calculated measurements.

10. The method as claimed in claim 1, further comprising the step of displaying all the calculated data on a monitor, to enable the operator to make the necessary adjustments.

* * * * *